Figure 1:
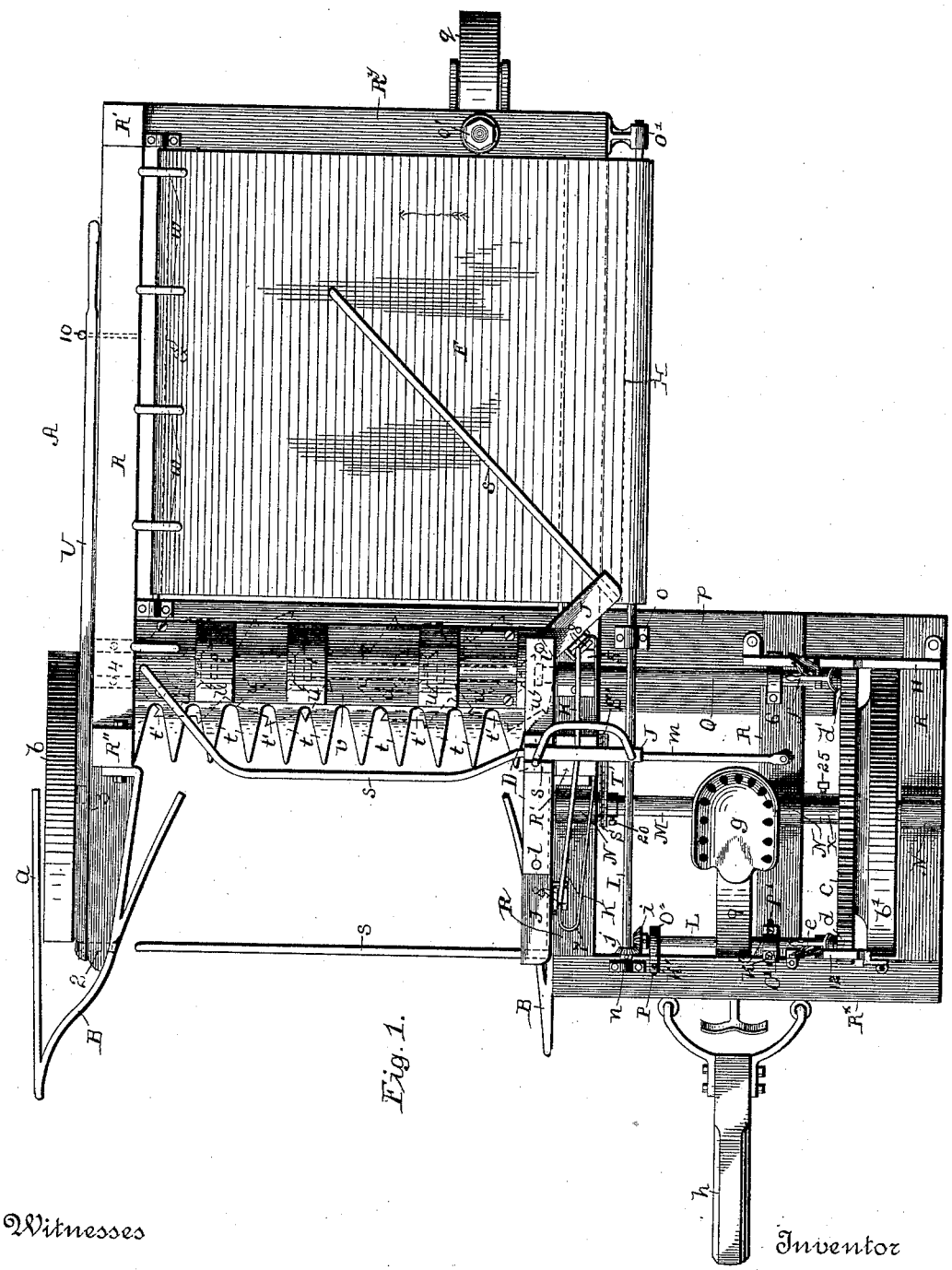

(No Model.) 3 Sheets—Sheet 1.

J. ARMSTRONG.
HARVESTER.

No. 436,392. Patented Sept. 16, 1890.

Witnesses
F. G. Fischer
R. A. Balderson

Inventor
John Armstrong
By his Attorneys
Higdon & Higdon

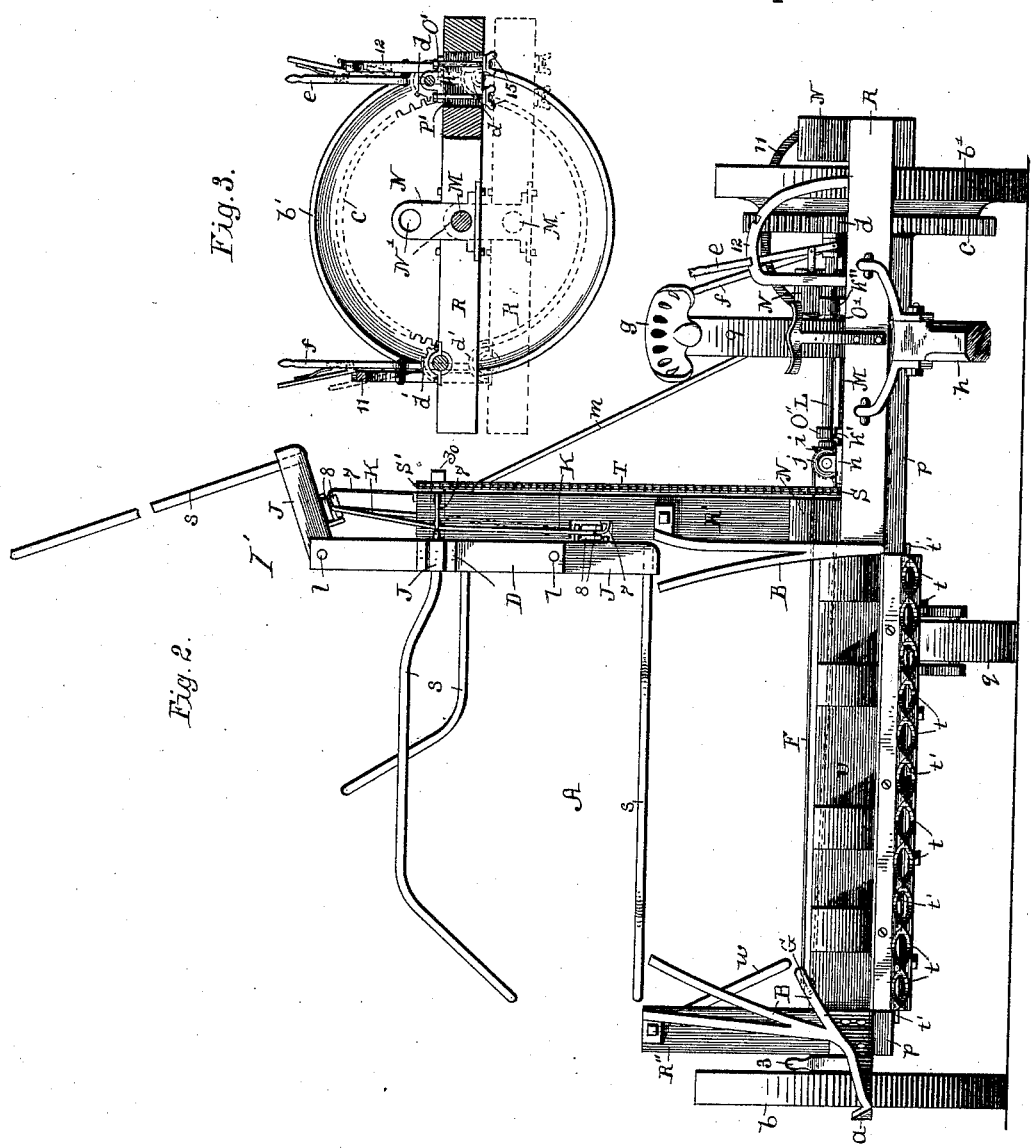

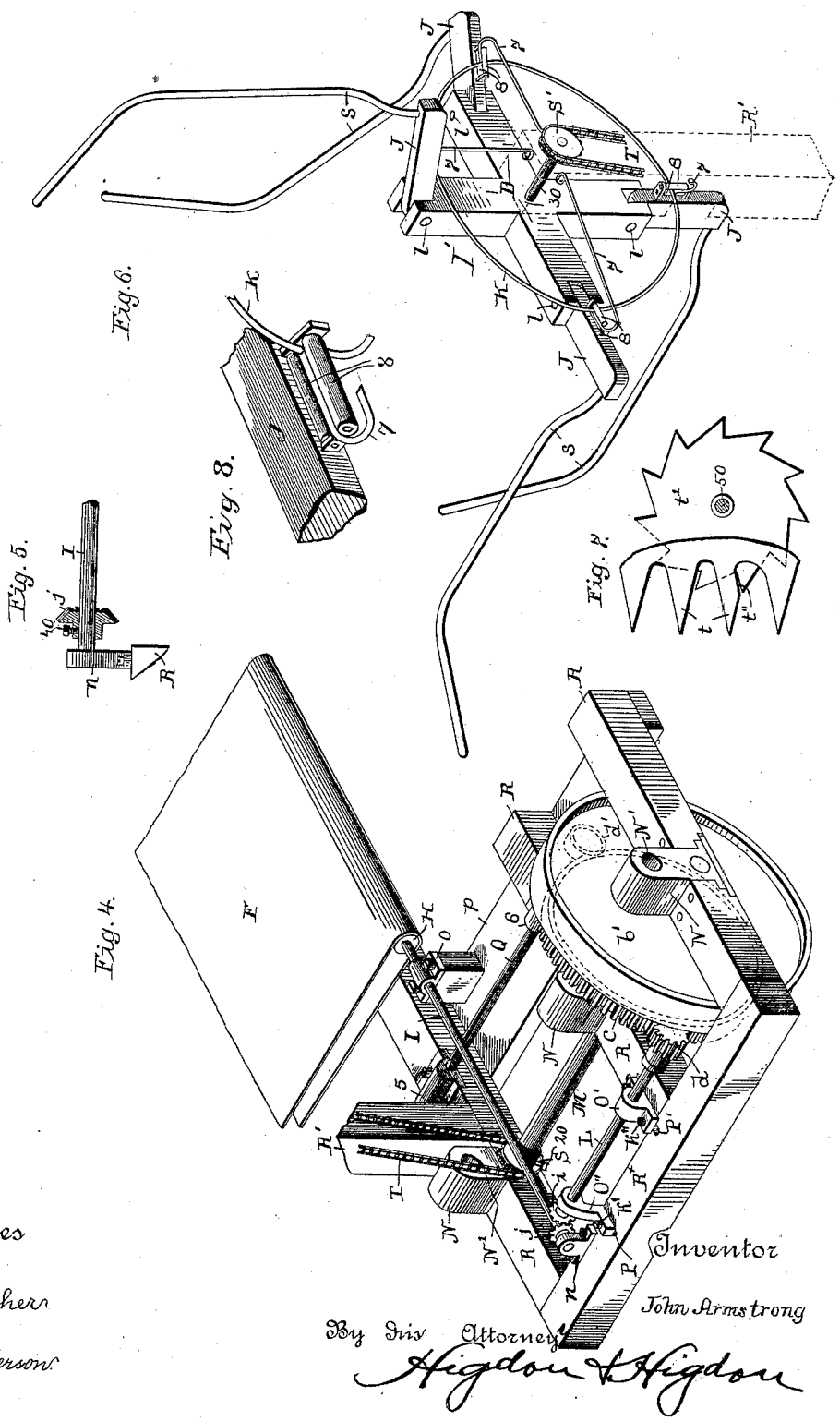

UNITED STATES PATENT OFFICE.

JOHN ARMSTRONG, OF VINE CREEK, KANSAS, ASSIGNOR TO HANNAH ARMSTRONG, OF SAME PLACE.

HARVESTER.

SPECIFICATION forming part of Letters Patent No. 436,392, dated September 16, 1890.

Application filed September 10, 1889. Serial No. 323,527. (No model.)

*To all whom it may concern:*

Be it known that I, JOHN ARMSTRONG, of Vine Creek, Ottawa county, Kansas, have invented certain new and useful Improvements in Harvesters, of which the following is a full, clear, and exact description, reference being had to the accompanying drawings forming a part hereof.

My invention relates to improvements in harvesters; and it consists in the combination and arrangement of parts hereinafter set forth and described.

In the drawings, Figure 1 is a plan view of my improved harvester. Fig. 2 is a front elevation of the same. Fig. 3 is a detail, partly in section, showing the manner in which the machine is lowered when it is desired to cut the stalks or straw close to the ground. Fig. 4 is a detail view in perspective, showing the arrangement of the gear. Fig. 5 is a broken detail view of the apron-shaft, showing the manner in which the bevel-gear that operates the said shaft is adjusted. Fig. 6 is a detail perspective of the reel and its supporting-post, which is shown in dotted lines. Fig. 7 is a broken detail view of the guards and one of the cutter-knives, and Fig. 8 is a detail perspective view of the rollers and a portion of the cam-ring for guiding same to operate the reel-arms.

Referring to the drawings, A designates my improved grain-harvester, consisting of a frame constructed of the horizontal longitudinal beams R, and the transverse beams $R^x$, P, and $R^y$, which frame carries the cutting part of the mechanism, while a vertical beam R' carries the arms for feeding the grain to the cutters. The frame is carried by main wheels $b\ b'$ and caster-wheel $q$, by means of which the machine is guided. B B designate the gatherers, which are secured to upright posts R' R''. As the machine is drawn forward the gatherers bring the stalks in contact with the reel, the shaft of which is journaled to an upright post R'. The reel consists of four or more radial arms D D, in the slotted ends of which are pivoted swinging arms J, carrying at their ends rods S, which are so bent as to prevent the heads of the corn or grain from slipping out from the ends of said rods, but tend to bring the corn or other grain in contact with the knives $t'$, which are protected by guards $t$.

The cutters are operated by means of bevel-gears $u\ u'$, the former of which is keyed on a shaft Q, the latter being secured to short vertical shafts 50, (shown in plan in Fig. 7,) which extend upward from the knives.

In order that the rotating knives may more readily cut the stalks at the guards located near the opposite edges of the knives, I provide the said guards with gillets $t''$, as shown in Fig. 7, and thus give the knives a square cutting-surface and prevent the grain slipping between the guards without being cut.

A shaft Q, directly in front of the apron F, Fig. 1, extends to the right-hand side of the machine from the large gear-wheel C, and serves to drive the rotary cutters $t'$ (shown in detail in Fig. 7) by means of bevel-gears $u\ u'$. (Shown in dotted lines in Fig. 1.) This shaft is given motion by a pinion $d'$ meshing with the gear-wheel C, cast integral with or attached to the driving-wheel $b'$.

Meshing with the gear-wheel C, and diametrically opposite to the pinion $d'$, is another pinion $d$, which gives motion to the shaft L, the two shafts Q and L being parallel with each other. By means of the bevel-gears $i$ and $j$ motion is given to the shaft I, carrying the apron-roller H, which drives the apron F, Fig. 1, and is journaled in the bearings $n\ o\ o'$. This shaft L is supported by the bearings O' O'', adjustable horizontally at a right angle to the shaft. To effect this adjustment, the bearing-boxes slide in slots P P', and are secured in place by the set-screws $k'\ k''$, and as this throws out of gear the bevel-pinion $j$ on the end of the shaft I, which extends at right angles to the shafts Q and L, Figs. 1 and 5, it is provided with set-screw 40, by loosening which it may be slid into gear again and then screwed into its place. This shaft I extends back to the rear end of the machine, and is provided with a roller H, which is connected to a roller G by means of apron F. Said apron F carries the cut stalks of grain over to the right-hand side of the machine, where they are deposited upon the ground in bunches, passing over the fingers or guides $w\ w$ and the beam R of the frame.

Reel I', which knocks the cut stalks upon the apron, comprising the cross-arm D, supported on a shaft 30 journaled in the upright post R', is provided with swinging arms J, which carry bent rods s. Said arms J are provided with rollers 8 on their face next to the reel-post R', (see Fig. 6,) the peripheries of which are a slight distance apart in order to permit the entrance of a circular wire or rod K, which is supported from the reel-post R' by means of rods 7, the outer ends of which are secured to the beam R' and the inner ends to the rod K. The bottom roller is journaled at both ends in suitable standards on the arm J, while the top one is only journaled at one end, so as to allow the rod K to pass between them, as will be clearly understood by reference to Fig. 8. Said circular rod K is bent so as to bring the swinging arms J in a parallel position with radial arms D while moving in a downward position. This brings the rods s in horizontal positions, so that they will come squarely against the stalks. As the reel revolves, the rollers 8 follow the bent periphery of circular cam-rod K and thus bring the arm J at right angles to the radial arms D when the arms J reach the top of the ring K, Fig. 6. This raises the bent rods to a vertical position, so that they will not come in contact with and scatter the grain.

Located on the end of reel-shaft 30 is sprocket-wheel S', which is connected to sprocket-wheel S, located on shaft M, which is located intermediately of the shafts Q and L, and has rigidly secured thereto the gear-wheel C for imparting motion to the same by means of chain T.

When I desire to cut the grain very close, I loosen screws 20 and 25 on the main shaft of the machine and remove shaft M from the lower perforations in the bearings N (see Fig. 3) and pass it through the upper perforations in the bearings, the slack in chain T being taken up by removing a sufficient number of links to make it taut. I then raise the handle of lever U on the right side of the machine, Fig. 1. The lever carries at 3 the bearings of one of the traction-wheels b, and at 2 is pivoted to the frame R of the machine, so that as the lever is raised or lowered the front of the machine is lowered or raised. To secure the lever in its adjusted position it is provided with a chain, (not shown,) which may be fastened to the hook-bolt 10, Fig. 1. Before lowering the machine I loosen the wing-nuts on the set-screws $k'$ and $k''$ in order that pinion $d$ may be adjusted so as to mesh with gear-wheel C.

To facilitate the removal of the shaft M, the driving-wheel $b'$ with the gear-wheel C, is mounted thereon by means of a sleeve X, Fig. 1, through which passes the set-screw 25. By loosening set-screws 20 and 25, as before described, the shaft M may be slid to the right past the reel-post, and then inserted in the other holes in bearing-boxes N.

While the machine is in operation on the field, pinion $d$ is thrown out of gear until apron F has received a load of cut grain, when it is thrown in gear and the grain deposited upon the ground in a bunch and not in the straggling manner it would be were the apron always in operation. The pinion $d'$ is also thrown out of gear when simply hauling the machine, thus stopping the shaft Q driving the knives. These two pinions $d$ and $d'$ mentioned as being thrown out of gear are mounted on sleeves keyed to the shaft by a feather-key and may be thrown into and out of gear by the hand-levers $e$ and $f$, provided with the usual stops and notched sectors 12 and 11, as illustrated fully in Figs. 1, 2, and 3.

The reel-post R' is secured against vibration by the brace $m$, Figs. 1 and 2.

$z$ is the driver's seat supported by the stay or beam 9, and $h$ is the pole or tongue by which the machine is drawn.

$w$ $w$ indicate a series of prongs depending from the horizontal beam P of the frame, and serve to guide the stalks onto the apron F.

Having thus described my invention, what I claim is—

In a harvester, the combination of a reel-post, a reel-frame journaled thereon, arms pivoted to the said reel-frame, a cam-ring, supports for the said ring secured to the outer periphery thereof and bent inward and secured to the reel-post, and rollers secured to the said arms inside of the cam-ring and projecting over the opposite faces of the said ring past the outer periphery thereof, as described.

In testimony whereof I affix my signature in presence of two witnesses.

JOHN ARMSTRONG.

Witnesses:
R. A. BALLERSON,
MAY SULLIVAN.